June 1, 1965   R. W. HAVENS ETAL   3,186,818
MOLD FOR FORMING THERMOPLASTIC MATERIAL
Filed June 5, 1961   3 Sheets-Sheet 1

INVENTORS
ROBERT W. HAVENS
BY EDWARD A. NOWAK
J. F. TEIGLAND &
J. R. NELSON
ATTORNEYS

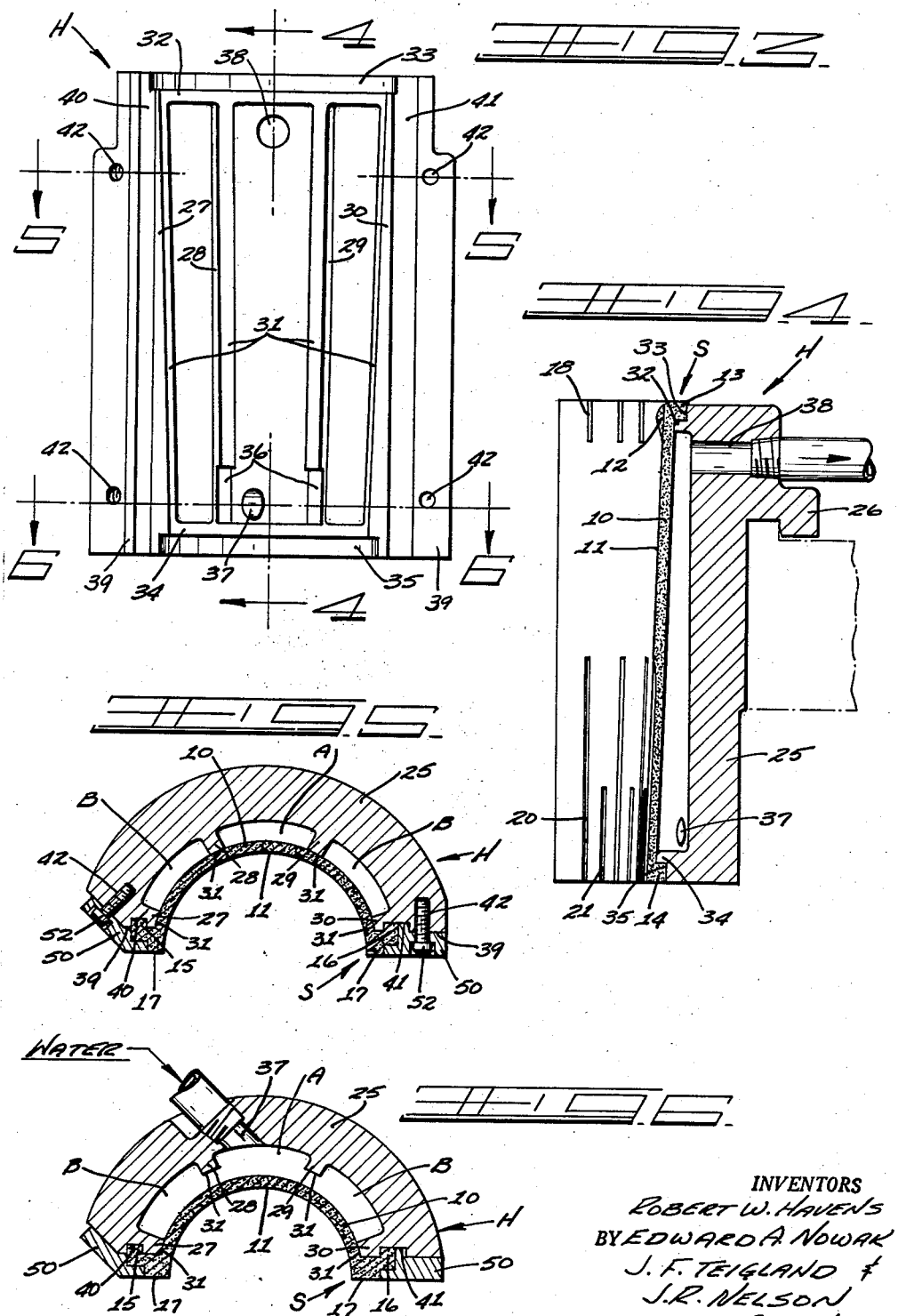

June 1, 1965  R. W. HAVENS ETAL  3,186,818
MOLD FOR FORMING THERMOPLASTIC MATERIAL
Filed June 5, 1961  3 Sheets-Sheet 3
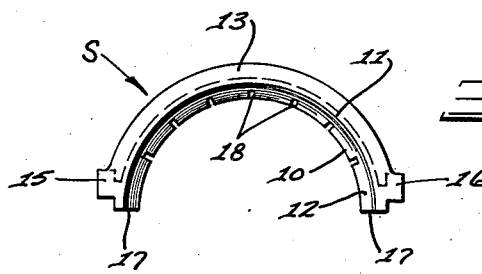
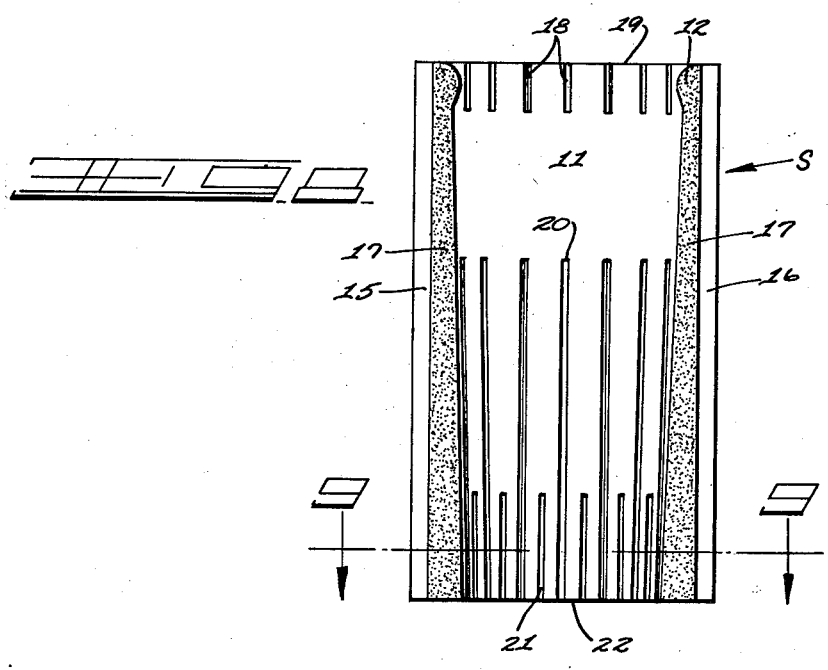
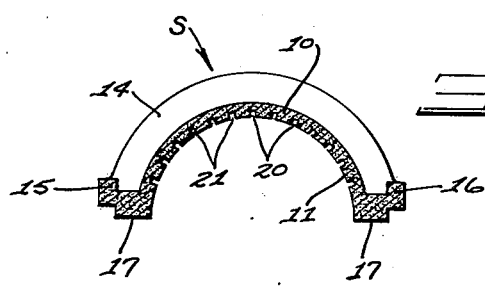
INVENTORS
ROBERT W. HAVENS
BY EDWARD A. NOWAK
J. F. TEIGLAND &
J. R. NELSON
ATTORNEYS United States Patent Office 3,186,818
Patented June 1, 1965

3,186,818
MOLD FOR FORMING THERMOPLASTIC
MATERIAL
Robert W. Havens and Edward A. Nowak, Toledo, Ohio, assignors to Owens-Illinois Glass Company, a corporation of Ohio
Filed June 5, 1961, Ser. No. 114,711
12 Claims. (Cl. 65—169)

This invention relates generally to a method and mold for forming thermoplastic material, and more particularly to a method and mold utilizing a porous molding cavity to form articles from thermoplastic material.

Our invention is directed primarily to the molding of thermoplastic material, such as glass for example, wherein it is desirable to remove heat from the material during the molding operation, and to produce a molded article having a smooth and unmarred exterior surface.

Our invention comprises, generally, backing a porous mold cavity with a vaporizable liquid, such as water, and allowing the thermoplastic material, which is in a heated condition during the forming operation, to vaporize the liquid to form a vapor cushion or barrier between it and the mold wall during the forming operation.

Whereas water has been used in connection with molds in the glass forming industry in the forming of glassware (the conventional "paste mold process"), it has not been possible in prior mold structures and processes to provide an adequate vapor cushion, or to control the uniformity of the cushion. The prior structures and processes have not been able to provide sufficient liquid or vapor during the forming operation to prevent sustained contact between the mold working surface and the thermoplastic material. This in turn has resulted in rapid mold wear due to contact with the thermoplastic material and lowered resistance to oxidation due to increased heating of the mold. Short mold life results in expensive mold repair, and objectionable and costly machine "down time." Furthermore, the exterior surface of the molded article has a lackluster appearance due to contact with the mold surface.

In the practice of the method and the use of the mold structure of our invention, increased mold life and greatly improved surface appearance is achieved by utilizing the heat of the article being formed to create a substantially uniform and continuous vapor cushion between the molding surface of the material.

Accordingly, it is an object of our invention to provide a superior method of molding articles from a thermoplastic material, wherein a liquid is continuously supplied to the exterior surface of a porous mold member.

Another object of our invention is to provide an improved method of forming articles from a thermoplastic material wherein a vapor cushion is created to maintain the article out of contact with the molding surface.

A further object of our invention is to provide improved mold structure for molding articles from thermoplastic material, wherein a vapor cushion is formed to maintain the material out of contact with the molding surface.

The specific nature of this invention, as well as other objects and advantages thereof, will become apparent to those skilled in the art from the following detailed description, taken in conjunction with the annexed sheets of drawings, on which, by way of example only, the preferred embodiment of this invention is illustrated.

In the drawings:

FIG. 3 is a side elevation view of the mold shell holder of our invention;

FIG. 4 is a sectional view taken along the line 4—4 of FIG. 3, with a porous mold shell in place in the holder;

FIG. 5 is a sectional view taken along the line 5—5 of FIG. 3 with a porous mold shell and retainers in place;

FIG. 6 is a sectional view, similar to FIG. 5, taken along the line 6—6 of FIG. 3;

FIG. 7 is a top plan view of the porous mold shell of our invention;

FIG. 8 is a side elevational view of the porous mold shell; and

FIG. 9 is a sectional view taken along the line 9—9 of FIG. 8.

The specific embodiment of our invention, as illustrated and described, is in conjunction with apparatus, such as the known Hartford-Empire No. 28 machine. In the mentioned machine apparatus, a glass parison is formed by pressing. This parison has an upper portion formed in a neck ring by which the parison is held and transferred to a blow mold station. At the blow mold station, the parison is placed between the halves of a partible blow mold and rotated by the neck ring which is rotated in a horizontal plane. The blow mold closes about the rotating parison, which is then blown (while still rotating) to fill the confines of the mold cavity. When blown, the resultant bottle cools until the blow mold opens and take-out tongs grab the bottle as the neck ring opens. Burn-off of the upper moil portion that was formed and held in the neck rings follows to produce a tumbler.

Basically, the preferred embodiment of our invention, which is shown and described herein, comprises providing a baffled water chamber behind a porous metal mold shell, filling the chamber with water, and allowing the water to permeate the shell to form a steam cushion between the shell and the glass during the blowing process. Our invention also includes the provision of annular series of longitudinal extending grooves which are arranged to vent excess steam through the moil portion of the mold shell, and also to vent excess steam and objectionable water condensate through the bottom of the mold shell.

Figure 1:
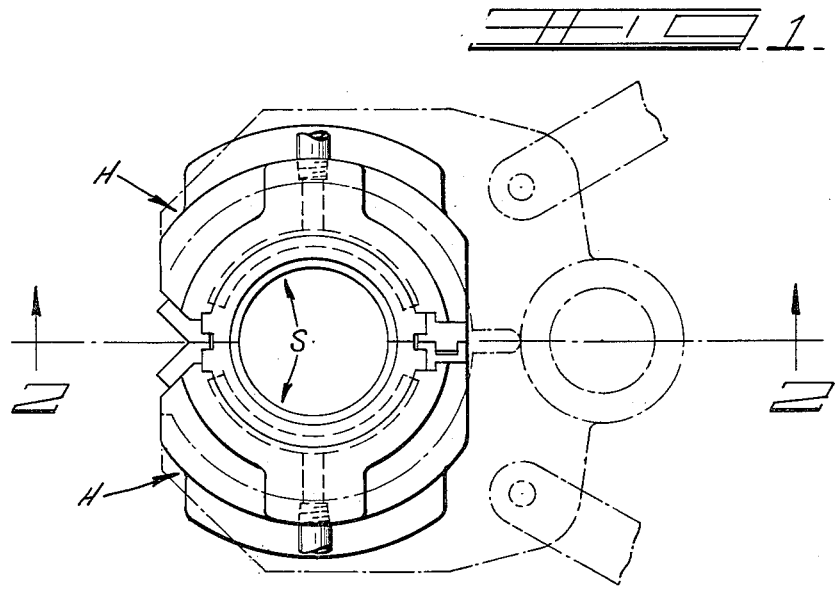
FIG. 1 is a top plan view of the mold of our invention mounted on conventional blow mold holder arms (shown by phantom lines)
Figure 2:
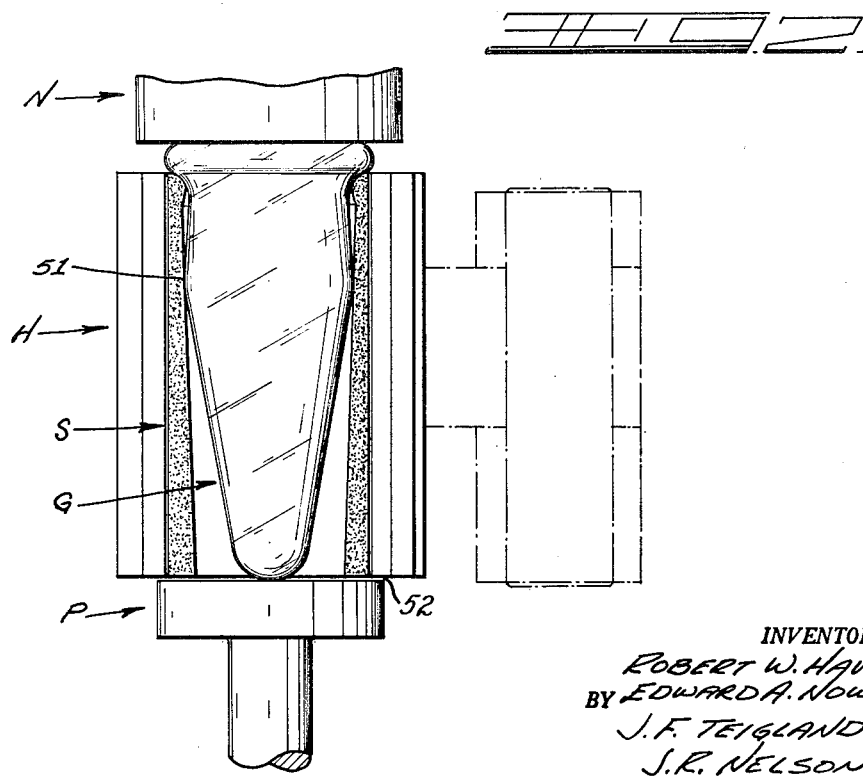
FIG. 2 is a sectional view taken along the line 2—2 of FIG. 1 with a glass parison and mold bottom plate shown in forming position.

Referring to FIGS. 1 and 2, the main elements of our invention comprise a pair of mating porous metal mold shells S that define a molding cavity, and a pair of mating mold shell holders H that are adapted to be secured to the blow mold station of forming machine apparatus, such as disclosed in U.S. Patent No. 7,744,358 to George E. Rowe. Referring particularly to FIG 2, a glass parison G, which is held in a conventional neck ring N, is shown in position just prior to blowing in the mold of our invention. The lower end of the mold of our invention is closed by a conventional mold bottom plate P, which can be independently operated to close the lower end of the molding cavity. It is to be understood of course that bottom plate P can, if desired, be secured to one of the mold shell holders H by conventional means.

The porous mold shell S is preferably a unitary structure having a network of interconnected voids or pores providing passageways between the inner and outer surfaces of the mold shell and also longitudinally of the mold shell side wall. The porous mold shell may be formed of a number of materials presently available. The preferred construction is that of powdered metal that has been molded into the desired configuration and sintered into a unitary structure. The preferred material is a bronze metal filter powder, comprised of copper coated with tin in a ratio of approximately 90% copper to 10% tin. The material is preferably fabricated as disclosed in the copending application to Robert W. Havens, Serial No. 684,029, filed September 16, 1957 and now abandoned, assigned to the assignee of this invention. The preferred shell is made with uniform porosity.

In the fabrication of the mold shell, the size and shape of the particles employed will predetermine the porosity of the mold shell. We have found it preferable to fabricate the porous mold shell of spherically shaped particles, having a size in a range of from 60 to 150 mesh.

Other materials available for forming a porous structure usable in this invention are particles of nodules of other metals, or non-metallic materials; such as, silicate materials, slag, ceramic materials, and some durable plastics, to name but a few as examples.

Referring to FIGS. 7–9, the mold shells S of our invention are complementary half sections which are capable of juxtapositioned relationship to form a contoured mold cavity. For certain tapered article shapes, mold shell S may be constructed as one piece, as is practiced presently in the mold arts generally. For the sake of ease of illustration only, the split or partible type of mold is shown and described herein. The main portion of the mold shell S is a semi-circular side wall 10, which is preferably of uniform thickness. See FIG. 4. The mold shell wall is contoured so that its inner or forming surface 11 defines one-half of a glass tumbler article. An annular shoulder 12, having an arcuate cross-section, is formed at the upper end of the forming surface 11. This shoulder 12 defines generally the moil on the blown glassware. The moil portion is subsequently burned off in burn-off apparatus. Annular shoulders 13 and 14 of substantially rectangular cross-section, are formed at the upper and lower ends, respectively, of the shell wall 10. The aforementioned shoulders 13 and 14 extend radially outwardly and are received by annular grooves formed in the holder H. The annular shoulders 13 and 14, and the aforementioned grooves serve to longitudinally locate the shells S relative to the holders H.

Referring particularly to FIGS. 7 and 9, longitudinally extending flanges 15 and 16 are formed externally on the side or lateral edges 17 of the mold shell wall 10. These flanges 15 and 16 are received by longitudinally extending notches formed in the holders H and cooperate with retainers 50 to maintain the mold shells S in the holders H.

An annular series of equally spaced, longitudinally extending grooves 18 are formed at the upper end of the forming surface 11. The grooves 18 are of substantially rectangular cross-section and extend through the top surface 19 of the mold shell wall 10.

Two annular series of equally spaced, longitudinally extending grooves 20 and 21, respectively, are formed on the forming surface 11 and terminate at the lower edge 22 of the mold shell wall 10. The grooves 20, which are of rectangular cross-section, commence at points above the midsection of the mold shell. The grooves 21 commence at points in the lower half of the mold shell S. The purpose of these grooves will be described hereinafter.

Referring to FIGS. 3–6, the holders H are a pair of complementary split-mold type holders. The holders H have semi-circular, upstanding side walls 25. An annular flange 26 extends radially outwardly from the outer surface of the wall 25. The annular flange 26 is arranged to engage blow mold holder arms, such as described in U.S. Patent 2,744,358, to Rowe.

Four longitudinally extending ribs 27, 28, 29, and 30 project radially inwardly from the inner surface 31 of the mold holder side wall 25. The inner surfaces 31 of the aforementioned ribs are sloped and arranged to closely coincide with the outer surface of the mold shell wall 10. The ribs 27–30 terminate, at their upper ends, in a continuous annular shoulder 32 that coincides with the outer surface of the mold shell wall 10. The upper surface of the shoulder 32 defines a portion of an annular groove 33 which is designed to receive the annular shoulder 14 formed on the mold shell.

The ribs 27–30 terminate, at their lower ends, in an annular shoulder 34 that coincides with the outer surface of the mold shell wall 10. The annular shoulder 34 defines a portion of an annular groove 35 which is arranged to receive the annular shoulder 14 of the mold shell S. The central ribs 28 and 29 have notches 36 at their respective lower ends, which prevent the central ribs, in that area only, from contacting the mold shell wall 10. See FIG. 6.

The mold holder wall 25, the ribs 27–30, and the mold shell wall 10 serve to define a central chamber A and two side chambers B. Referring to FIG. 6, an inlet orifice 37 is formed in the holder side wall 25 and communicates with the central chamber A. The inlet orifice 37 is connected to a water supply source (not shown). At the upper end of the central chamber A is formed an outlet orifice 38, which extends through the side wall 25. The outlet orifice 38 provides a restricted passageway to the atmosphere.

On the side edges or lateral surfaces 39 of side wall 25 are longitudinally extended notches 40 and 41, respectively. The notches 40 and 41 are arranged to receive flanges 15 and 16 on the mold shell S. The lateral surfaces 39 also have formed thereon threaded holes 42.

The mold shell S fits snugly within the holder H with the back or outer surface of the mold shell wall 10 engaging the ribs 27–30 of the aforementioned central chamber A and side chambers B. The mold shells S are retained in place by means of retainers 50 which in part overlie the flanges 15 and 16 of the mold shells and are secured to the holder H by means of bolts 52 in the threaded holes 42.

In operation, the mold shells S are mounted in their holders H by means of retainers 50. The mold shell holders H are secured to the mold carrier of the glass forming machine. The inlet orifice 37 is connected to a source of water (a vaporizable liquid) and a water supply valve (not shown) is opened to emit water to the chambers A and B. After the chambers have been filled, the water supply valve is regulated so that only a trickle of water overflows from the outlet orifice 38. Some of the water within the chambers will permeate the mold shell wall 10 and wet its forming surface 11. The mold of our invention is now ready to be cycled in the glass forming process.

The glass parison G is placed between the mold halves and they are closed. Air under pressure is introduced into the interior of the parison to blow the glass wall of the parison to a position closely adjacent to the forming surface of the mold shell. The radiant heat of the glass parison vaporizes the water on and at the surface of the mold shell into steam to create a steam cushion that keeps the glass out of contact with the inner wall or forming surface of the mold shell. The steam cushion is initially formed at a point 51 at the upper end of the mold shell. See FIG. 2. As the blow air continues to be introduced into the parison, the wall of glass moves into its final shape, spreading out continuously from the point where the steam cushion was initially formed, thereby driving a wave of steam or steam condensate before it. Since the parison is being continuously rotated relative to the mold shell, any steam pockets which may tend to form will vent through the longitudinally extending grooves (18, 20 and 21) and the excess steam will exit from either the moil portion of the mold or through the space 52 provided between the mold shell and the bottom mold plate. The space 52 is formed by adjusting relative location of the mold bottom plate P and is made sufficiently small to prevent the escape of glass. Steam condensate, which will typically form at the lower end of the mold shell, will also exit between the mold shell S and the bottom plate P.

When it is desirable to construct a one mold structure, the lower ends of the grooves 20 and 21 can be connected to the atmosphere by means of radially outwardly extending holes formed, in register with grooves, in the mold holder and shell at a point below or not in line with the water jacketed portion of the mold.

As the water beneath and on the forming surface of the mold shell vaporizes into steam and the glass parison expands, a back pressure will be formed in the water chambers A and B. This pressure is somewhat less than the pressure of the blow air. This pressure within the water chambers will cause a quantity of water to gush out through the unrestricted outlet orifice 38. The baffles or ribs, however, prevent the side chamber from emptying at their upper end, thereby retaining a sufficient supply of water at the upper portion of the mold shell to create a sufficient steam cushion in this area. It may be noted that it is preferable not to restrict the outlet orifice 38, thereby allowing the back pressure within the chambers to be relieved. If the back pressure is not relieved, the blowing pressure must be increased to prevent collapse of the glass parison. At a point in the blowing cycle, a pressure equilibrium is reached between the blow pressure internally of the glass parison and the vapor pressure at the forming surface of the mold shell. At this equilibrium point the glass will discontinue its expansion toward the molding surface, the heat of the glass continuing to generate sufficient steam, from the water constantly in contact with the mold shell wall 10, to prevent physical contact between the glass and the molding surface 11.

When the glass article has been finally formed, the mold halves are opened and the article is ready to be transferred to a subsequent point in the forming process. The final article will have extremely high luster similar to fire polished ware. This is due to the fact that the surface of the ware is not contacted by the molding surface; and hence, its characteristics are determined by the cohesive forces on the glass surface itself.

Water is the preferred vaporizable medium because of its low cost and availability. It is to be understood, of course, that other vaporizable liquids may be used, and in a closed system wherein this is recirculated, more costly liquids can be used.

It should also be noted that increased operating speeds can be achieved with the mold of our invention, since heat is removed more quickly from the material by both the vaporization of the liquid and the water cooled mold. Another important feature of our invention is that the heat energy carried by the steam is removed by venting the steam to the atmosphere, and also by transfer to the water backing the mold shell, which is in constant contact, through the pores of the mold shell, with the steam.

While the preferred embodiment illustrated discloses the use of our invention with glass, it is to be understood that our invention can be used in the forming of other thermoplastic materials, such as synthetic resins.

Additionally, it should also be noted the mold shell of our invention, due to its water backing and the steam cushion on its forming surface will at all times be operated at or below the boiling point of water.

While one embodiment of the present invention has been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:

1. A mold for forming glassware, said mold comprising a porous member having inner and outer surfaces, said inner surface defining a molding cavity, means for continually supplying water to the outer surface of said member, and means formed in the inner surface of said member and extending a substantial distance thereof for selectively venting the inner surface of said member to the atmosphere when forming said glassware.

2. A mold as defined in claim 1, wherein said water supply means comprises a holder surrounding the outer surface of said member and being in part spaced therefrom to form a closed chamber, a water inlet orifice opening into the lower end of said chamber and an overflow orifice opening out of the upper end of said chamber.

3. A mold as defined in claim 1, wherein said vent means includes a plurality of longitudinally extending grooves formed on said inner surface, said grooves having one end thereof open to the atmosphere.

4. A mold as defined in claim 2, including at least one longitudinally depending rib dividing the upper end of said chamber into separate sub-chambers interconnected at their lower ends.

5. A partible mold for forming glassware, said mold comprising, a porous metal member, said member comprising a pair of complementary mold cavity defining shells having inner and outer surfaces, said inner surfaces cooperatively defining a molding surface, a holder adapted to support said member, said holder comprising a pair of mating elements, each of said elements supporting one of said shells and surrounding the outer surface of each of said shells, said elements being spaced from said outer surfaces to define a chamber contiguous to each of said outer surfaces, means for continuously supplying water to each of said chambers, comprising an inlet orifice at the lower end of each of said chambers and an outlet orifice at the upper end of each of said chambers, and means for selectively venting each said inner surface during the forming of said glassware to remove excess steam formed by said glassware.

6. A mold as defined in claim 5, wherein said vent means comprises a plurality of longitudinally extending grooves formed on said inner surface, said grooves having one end extending to the atmosphere when forming glassware.

7. A mold as defined in claim 5, further including a pair of longitudinally depending ribs extending from the top of said chamber to a point near the bottom of said chamber, said ribs being laterally disposed on either side of said outlet orifice whereby said chambers are each divided into three sub-chambers which are interconnected at their lower ends.

8. In a mold having a water backed porous metal wall forming the molding cavity, the improvement comprising venting means for the surface of said cavity comprising a plurality of longitudinally extending grooves formed in the forming surface of said metal wall, said grooves extending from adjacent the point of first generation of steam to the atmosphere.

9. In a mold having a water backed porous metal side wall forming an open ended molding cavity, means for venting the forming surface of said metal wall comprising a plurality of longitudinally extending grooves formed on the forming surface of said wall, said grooves having at least one end thereof terminating at said open ends, thereby connecting said grooves to the atmosphere, said grooves being equally spaced about the periphery of said cavity.

10. Venting means as defined in claim 9, wherein said grooves are arranged in two sets of evenly spaced and axially separated series, with one set of grooves terminating at the top of the wall and the other set terminating at the bottom of said wall.

11. A mold comprising a porous member having inner and outer surfaces, said inner surface defining a molding cavity, a holder adapted to support said member, said holder surrounding the outer surface of said member, a portion of said holder being spaced from said outer surface to form a closed chamber therewith, an inlet opening formed in said holder and communicating with said chamber at the lower end thereof through which a vaporizable liquid is continuously flowed, and an overflow orifice communicating with said chamber at the upper end thereof, with said overflow orifice opening to the atmosphere.

12. A mold as defined in claim 11, further including at least one longitudinally extending baffle between the holder and the porous member dividing said chamber into separate sub-chambers, said baffle extending from the top of said chamber to a point near the bottom of said chamber.

References Cited by the Examiner
UNITED STATES PATENTS

| | | | |
|---|---|---|---|
| 958,613 | 5/10 | Forgo | 65—25 |
| 2,555,712 | 6/51 | Smith | 65—26 |

DONALL H. SYLVESTER, *Primary Examiner.*